Oct. 25, 1960   L. J. McMURTREY ET AL   2,957,308
FLOW DEFLECTOR GRID
Filed July 3, 1957   2 Sheets-Sheet 1

INVENTOR.
Lawrence J. McMurtrey
Clark M. Long
BY

INVENTOR.
Lawrence J. McMurtrey
Clark M. Long
BY
Duane C. Bowen

United States Patent Office 2,957,308
Patented Oct. 25, 1960

2,957,308

FLOW DEFLECTOR GRID

Lawrence J. McMurtrey and Clark M. Long, Wichita, Kans., assignors to Boeing Airplane Company, Wichita, Kans., a corporation of Delaware Filed July 3, 1957, Ser. No. 669,762

2 Claims. (Cl. 60—35.6)

Our invention relates to a flow deflector grid to be positioned at the forward end of a supersonic inlet to produce an effective zero degree angle of attack and yaw within the inlet. The grid has a series of grid elements on intersecting lines producing a series of openings. By the shape and spacing of the grid elements, the air stream is straightened and shock waves and expansion fans are controlled.

The efficiency of supersonic inlet ducts is decreased if compression waves and expansion fans, due to the angle of attack or yaw are uncontrolled. If the straightening of the air stream were to be accomplished by the interior walls of the inlet, the inlet would have to be unduly long. As Mach numbers increase, the inlet duct would have increased length.

It would be desirable to inject water at the forward end of a supersonic inlet duct. Injection of water at this point will cool the air and result in a lower temperature at the inlet of the engine. Higher Mach numbers can be reached with the same engine by this cooling action because critical temperatures would not be reached as soon at the inlet end of the engine. Another purpose of water injection is to produce more thrust in emergency conditions. However, it is difficult to inject water in a supersonic inlet duct because a water stream entering the air stream at an angle thereto will produce shock waves.

The objects of our invention include: to provide means in a supersonic inlet duct to produce an effective zero degree of attack and/or yaw; to devise means to compensate for other than zero degrees of attack without unduly lengthening the inlet duct; to devise a flow deflector grid to achieve the above results; and to provide means for injecting water at the forward end of the inlet duct at a minimum angle relative to the air stream.

Our invention will be best understood, together with additional objectives and advantages thereof, from a reading of the following description, read with reference to the drawings in which.

Figure 1:
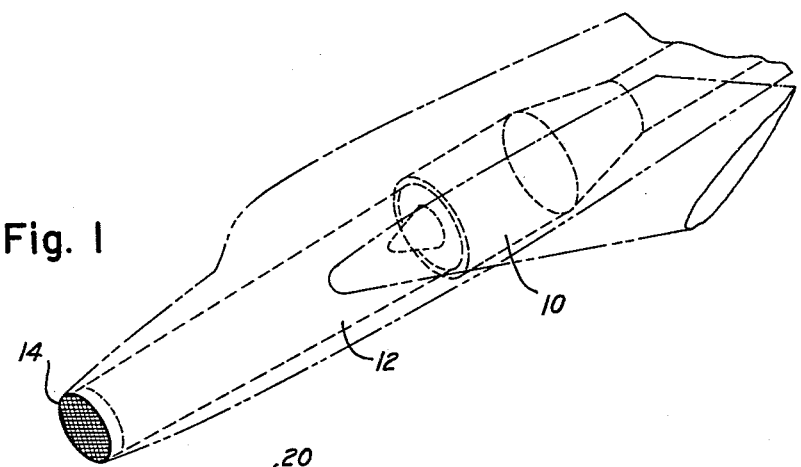
Figure 1 is a perspective view of the forward portion of an aircraft incorporating a specific embodiment of our flow deflector grid in an inlet duct.
Figure 2:
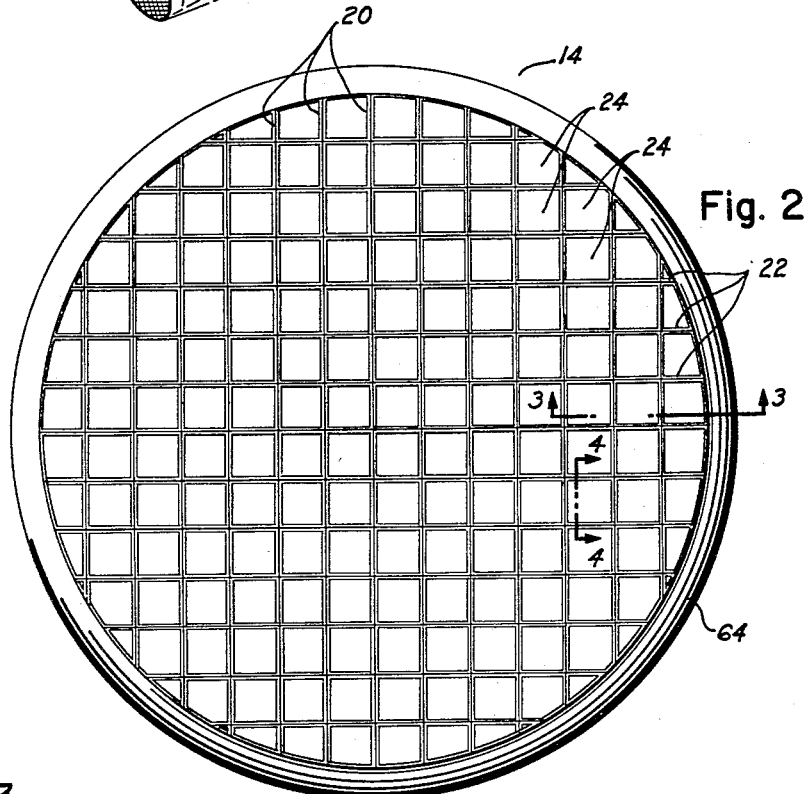
Figure 2 is an enlarged elevational view of the grid.
Figure 3:
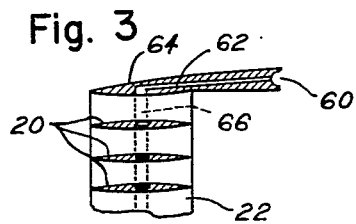
Figure 3 is an enlarged, fragmentary sectional view taken on line 3—3 of Figure 2.

Figure 1 shows in dotted lines a typical inlet duct installation including a turbine power plant 10 and an inlet duct 12. An inlet deflector grid 14 is positioned at the forward end of the inlet duct. It will be understood that the ducts will be positioned at different locations depending on the design of the aircraft. If grid 14 were not used, the section of the inlet duct used to straighten air flow due to operation at other than zero degrees attack might be as long as 15 feet or more depending on the maximum operating Mach number. For convenience of presentation, this description will be mostly in terms of angle of attack but it will be understood that most of the considerations also apply to yaw.

We provide for straightening of the air stream by the flow deflector grid, which may be less than a foot thick in the fore and aft direction. The grid is a precision product and high efficiencies are obtained through its use as will be evident from the following description.

In the specific embodiment, grid 14 is circular and is formed by a series of parallel vertical grid elements 20 and a series of parallel horizontal grid elements 22 intersecting at right angles. A substantially square series of openings 24 are produced. However, other configurations may be used in which other than square openings are produced, such as arc segments or trapezoids, if the limitations set forth below are followed. If horizontal and vertical grid elements are used, the horizontal elements will act principally regarding the angle of attack and the vertical elements will act principally regarding yaw.

Figure 4:
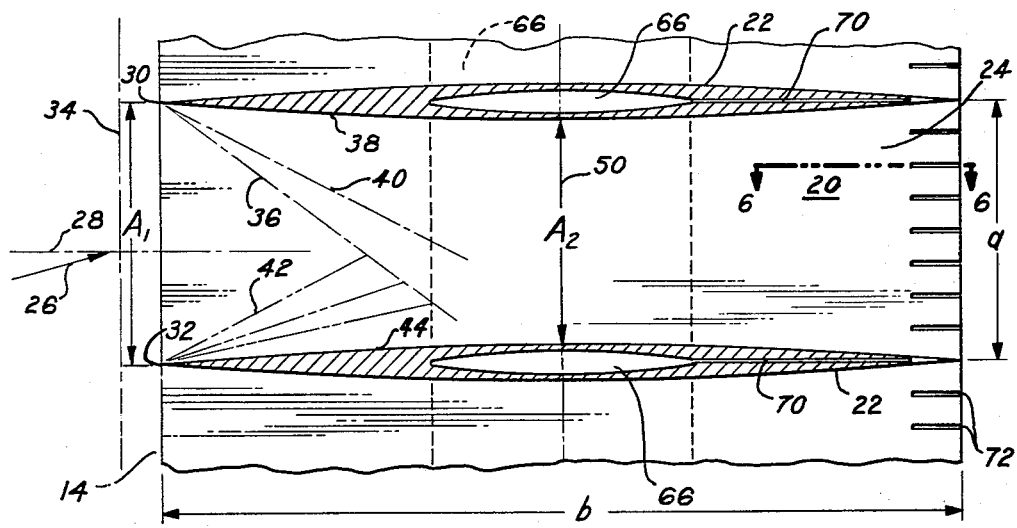
Figure 4 is an enlarged, fragmentary sectional view taken on line 4—4 of Figure 2.

Considering Figure 4, the ability of the grid elements to straighten the air flow, as indicated by the arrow 26, is dependent partially on the relation of dimensions $b$ and $a$. Dimension $b$ is the thickness of the grid fore and aft and dimension $a$ is the spacing of the grid elements in some direction lateral of the inlet duct. In other than vertical-horizontal grid arrangement, dimension $a$ will be lateral of the duct in the plane of the angle of attack and/or yaw to be corrected. It may be desirable in some installations to control the dimension $a$ only for angle of attack or only for yaw. The arrow 26 indicates that the air stream is at an angle to a line such as 28 parallel to the axis of the inlet duct and this angle may be due to angle of attack, yaw or a combination thereof depending on the position of the aircraft and the orientation of the grid elements. In the Figure 4 presentation in a vertical section, the angle would be attributable to the angle of attack. The following table shows the approximate optimum minimum ratio of dimensions $b$ to $a$ for planes operating up to a given Mach number as the angle of attack approaches zero.

| Mach: | $b/a$ |
|---|---|
| 1.5 | 1.0 |
| 2.0 | 1.6 |
| 3.0 | 2.6 |
| 4.0 | 3.5 |
| 5.0 | 4.7 |

Suitable spacing of the grids for some installations would be one to two inches. From the table, this would mean that dimension $b$ would be a minimum of three and one-half inches for the one inch spacing at Mach 4 and seven inches for the two-inch spacing at Mach 4.

The $b$ to $a$ ratio is determined by the condition at which a Mach wave from the leading edge of an element strikes the trailing edge of the adjacent element. The Mach wave is the zero strength propagation of a disturbance away from its origin at an angle between the flow axis and the wave which is termed the Mach angle. Hence the $b/a$ or length-to-spacing ratio is equal to the cotangent of the Mach angle. This length-to-spacing ratio is the minimum operative value as the angle of attack approaches zero.

The leading edges 30, 32 of the grid elements, with a 15° angle between the air stream 26 and axis 28, would produce a normal shock wave 34 at Mach 1, would produce an oblique shock wave 36 at an angle of approximately 34° to the adjacent face 38 of the grid element at Mach 3, and would produce an oblique shock wave 40 at an angle of approximately 26° to face 38 at Mach 5. On the opposite side of the opening 24, an expansion fan would be produced at Mach 3 and 5. Figure 4 shows the general pattern of a fan 42 which would be produced under the given conditions at Mach 3. The center line of the fan would be at an angle of approximately 15° to the adjacent face 44 of the grid element. An interaction is produced between the compression wave and the expansion fan so that pressure conditions will be normalized at the trailing portion of opening 24 when the given ratios of dimensions $b$ to $a$ are followed.

The cross sectional outlines of the grid elements 20, 22 are also important in achieving the desired results. The leading edges 30, 32 should be as sharp as possible. The grid elements have to be finely tapered between leading edge 30 and the necked medial portion, and the following table shows approximately the optimum relationship between Mach number and the minimum ratio of the area $A_2$ of opening on line 50 halfway to the trailing edge (one-half dimension $b$) to the area at the leading edge $A_1$. If this ratio is reduced, normal shock waves are produced resulting in high pressure losses. Line 50 will be the most severely necked portion of opening 24 if the grid elements are symmetrical as to leading and trailing portions and this is desirable.

| Mach: | $A_2/A_1$ |
| --- | --- |
| 1.0 | 1.00 |
| 1.1 | .99 |
| 1.2 | .98 |
| 1.5 | .91 |
| 2.0 | .82 |
| 3.0 | .72 |
| 4.0 | .67 |
| 5.0 | .65 |

The $A_2/A_1$ ratio is the unique ratio at which the flow behind a normal shock generated in the free supersonic stream will accelerate to Mach 1.0 at $A_2$. This unique ratio allows establishment of supersonic flow in the duct. The tabulated ratios are minimum values for existence of supersonic flow in the duct. An $A_2/A_1$ ratio, as close to 1.00 as possible but consistent with manufacturing techniques, preferably should be selected in order to minimize losses and give maximum efficiency. This is because the selected ratio is below the minimum values in speeds of operation between Mach 1 and the speed at which the ratio is appropriate according to the table.

As shown by the table, the grids could have no thickness if normal shocks were to be avoided at Mach 1. However, the pressure losses are not as great at these lower Mach values. At higher supersonic speeds, where pressure losses would be greatest, the values of the ratio $A_2/A_1$, are such that the grid elements can have sufficient thickness to be manufactured. The grids on any particular airplane will be designed with the needed minimum ratio of $b/a$ for the maximum speed, for the normal operating speed or for another selected speed. Excessive pressure losses would occur due to any operations in excess of the selected speed. The ratio of $A_2/A_1$ likewise may be minimum ratio for the designed maximum speed, for the normal operating speed or for another selected speed. However, the selection may not be the same as for the $b/a$ ratio and preferably is selected as the maximum value susceptible of manufacture. The values given are optimum in that they will compensate for the most difficult condition to correct in which the angle of attack or yaw approaches zero degrees.

The trailing portions of the grid elements should have a comparable outline to that of the leading portions in order to avoid boat-tail drag. Having in mind weight penalties, needed structural strength, and limitations of manufacturing techniques, dimension $a$ is preferably one to two inches as previously indicated.

The advantages to be obtained by injection of water forward of the compressor have been related. Maximum mixing of the air and water is achieved if the water is injected as far forward of the inlet duct 12 as possible. If the water is injected at an angle to the longitudinal axis of the inlet duct or in being injected fans so as to produce an angle to the axis, then the air stream striking the water will produce shock waves. Whether or not the shock waves will be acceptable will depend on the angle and the Mach number. Injection of water from our inlet deflector grid is adapted to produce the minimum angle by injecting the water directly aft. Water passes from a manifold 60 through passageways 62 in the supporting ring 64 for the grid elements and then flows into passageways 66 formed within the grid elements. Preferably passageways 66 appear both in horizontal and vertical grid elements. A suitable operating pressure would be about 200 p.s.i. A series of discharge passageways 70 lead from the trailing edge portion to passageways 66. In order to provide passageways at the extreme trailing edges in areas of minimum thickness, discharge passageways 70 are joined by slots 72. A spacing between slots of about one-quarter inch is suitable. Water injected directly rearwardly from passageways 70 through slots 72 will have a minimum tendency to cause harmful shock waves.

Figure 5:
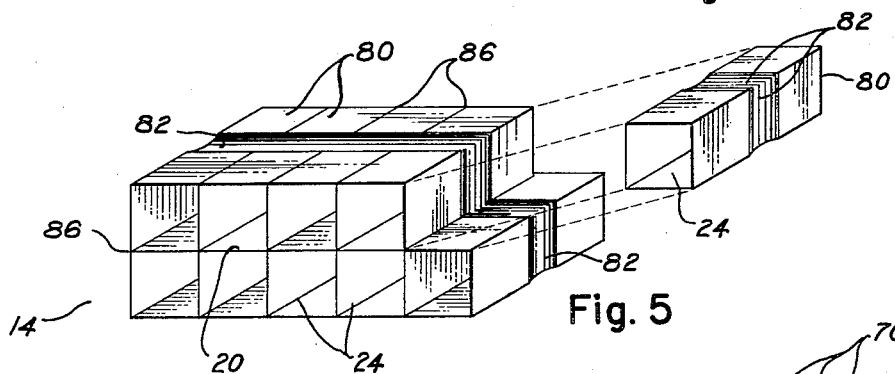
Figure 5 is a perspective view of a series of grid members with one member in removed position indicating the manner of fabrication.
Figure 6:
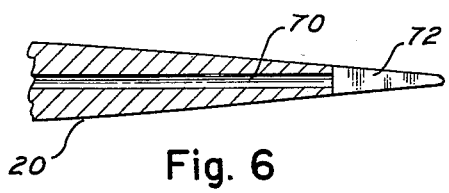
Figure 6 is an enlarged, fragmentary sectional view taken on line 6—6 of Figure 4.
Figure 7:
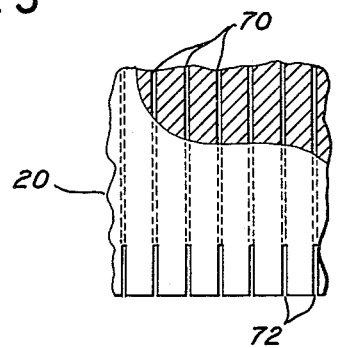
Figure 7 is an enlarged, fragmentary plan view of the trailing edge of the grid elements.

Because of the very thin cross sections and sharp edges, grid 14 must be fabricated as a precision piece. The means of fabrication may take different forms depending on the shape of the inlet and the designed maximum speed of the aircraft, e.g., at higher Mach numbers the grid elements may be thicker. Figure 5 shows means adapted to construct the grid elements from castings. The grid 14 is fabricated from a series of block-shaped grid members 80 having the openings 24 formed therein and having their outer surfaces adapted to be joined at the center lines of grid elements 20, 22. Passageway 66 is formed by matching grooves 82 in the walls of members 80. Blocks 80 may be formed by casting and stainless steel would be a suitable casting material to meet the strength requirements of grid 14. The blocks 80 may be secured together by brazing, as on the planes of lines 86. Passageways 70 may be drilled from slots 72 after fabrication or may be formed by the casting process or other operations before fabrication. Slots 72 may take the form of saw cuts. In other forms of casting or fabrication, segments larger than members 80 may be formed.

Having thus described our invention, we do not wish to be understood as limiting ourselves to the precise details of construction shown, but instead wish to cover those modifications thereof which will occur to those skilled in the art from our disclosure and which fairly fall within the scope of our invention, as described in the following claims.

We claim:
1. Means for straightening air flow approaching the entrance of a supersonic inlet duct of an aircraft at an angle of attack and/or yaw, comprising: a series of fixed, intersecting grid elements arranged in a grid pattern forming a series of openings therebetween and said series of grid elements extending substantially at right angles to the duct axis at the forward end of said duct; each grid element having in cross section an outline elongated in the direction of the duct axis and streamlined to sharp leading and trailing edges from the medial portion thereof which is thicker whereby said openings are medially necked, the ratio between the distance between grid element leading and trailing edges, and the distance across each opening in a plane parallel to said axis and including said angle, being no less than the cotangent of the Mach angle corresponding to a first selected Mach number in excess of 1; the ratio between the area of each opening at the medial necked portion thereof, to the area of the opening at the leading edge, being no less than a value, at which the flow behind a normal shock generated in the free supersonic stream at a second se- lected Mach number will accelerate to Mach 1 at said necked portion, said second selected Mach number being greater than 1 and no greater than the maximum speed of the aircraft.

2. The subject matter of claim 1 in which at least part of said grid elements have fluid passageways therein ported directly rearwardly to the trailing edge for fluid injection directly rearwardly into said duct, and a source of water connected to said fluid passageways whereby means are provided operative to eject water into said inlet duct.

References Cited in the file of this patent

UNITED STATES PATENTS

| | | |
|---|---|---|
| 2,663,993 | Mosser | Dec. 29, 1953 |
| 2,772,620 | Ferri | Dec. 4, 1956 |
| 2,788,183 | Ferri | Apr. 9, 1957 |
| 2,863,282 | Torell | Dec. 9, 1958 |
| 2,874,537 | Scarborough et al. | Feb. 24, 1959 |